United States Patent Office 3,130,005
Patented Apr. 21, 1964

3,130,005
PROCESS FOR THE PURIFICATION AND ACTIVATION OF TITANIUM TRICHLORIDE
Erhard Siggel, Laudenbach (Main), Gerhard Meyer, Obernburg (Main), and Wolfgang Rösener, Erlenbach (Main), Germany, assignors to Vereinigte Glanzstoff-Fabriken AG, Wuppertal-Elberfeld, Germany
No Drawing. Filed Sept. 5, 1961, Ser. No. 135,793
Claims priority, application Germany Sept. 7, 1960
2 Claims. (Cl. 23—87)

The present invention is directed to a process for activating and purifying titanium trichloride and to the use of said titanium trichloride in olefin polymerization reactions. More particularly, the present invention is directed to a process for obtaining substantially pure and active titanium trichloride from titanium tetrachloride.

Titanium trichloride is often used as a catalyst in polymerizing olefins, especially in polymerizing propylene. One of the best known and most advantageous methods for producing titanium trichloride includes the step of reducing titanium tetrachloride. The reduction of titanium tetrachloride to form titanium trichloride can be carried out at high temperatures with hydrogen or by a simpler process with aluminum organic compounds.

When using titanium trichloride in the polymerization of alpha-olefins it is essential that a high degree of purity be obtained. This means that the titanium trichloride should be free or substantially free from titanium tetrachloride. Literature references which are directed to olefin polymerization processes or the manufacture of catalysts which are used in such processes frequently point out that the titanium trichloride must be purified. For the production of high crystalline and purified titanium trichloride, it is necessary to wash the material repeatedly with heptane (see Natta, SPE Journal, May 1959).

Even though the titanium trichloride is washed repeatedly with heptane, it still does not have the degree of purity which is required for the polymerization of olefins. This is established by the fact that the yield of isotactic polymerizate is too low. When titanium trichloride, which has been purified by repeated washings wth heptane, is used as a catalyst, the yield of isotactic polymerizate is only about 70% to 80%. This is true even though claims have been made that greater yields are obtainable. Yields of 90% of isotactic polyproplene, for example, are not accurate insofar as they refer to the proportion of isotactic polypropylene after the separation of the polymerizate from the liquids used in the polymerization process. It is known that the polymerization is carried out in dispersion agents such as n-heptane. At the end of the process alcohol is added to the polymerizate dispersion which is then syphoned off with the bulk of the polymerizate. A portion of the atactic polymerizate substances, however, remains dissolved in the dispersion agent and is syphoned off with said agent. This can easily be determined by evaporation. Depending on the nature of the dispersion agent, it may contain from about 5% to 20% atactic polymerizate based on the total polymerizate. This quantity of polymerizate must be taken into account when calculating the yield of isotactic polymerizate, that is, this amount must be added to the percentage of the atactic substances contained in the solid polymerizate.

It is an object of the present invention to provide an improved method of purifying titanium trichloride.

Another object of the invention is to provide an improved method of producing substantially pure and activated titanium trichloride from titanium tetrachloride.

Still another object is to provide an improved process for polymerizing olefins.

Other objects of the invention will become apparent to those skilled in the art from the following detailed description.

In general, the present invention comprises the discovery that substantially pure titanium trichloride can be obtained if the titanium trichloride is treated with a homogeneous alcohol-hydrocarbon mixture which contains from 0.01 to 90 mol percent alcohol after preliminary purification of the titanium trichloride by washing with inert hydrocarbons.

Suitable alcohols which can be used in the process include alkanols with 1 to 18 carbon atoms and preferably 1 to 8 carbon atoms, alkanediols with 2 to 18 carbon atoms and preferably 2 to 6 carbon atoms, alkanetriols with 2 to 18 carbon atoms and preferably 2 to 6 carbon atoms, cycloalkanols with 5 to 7 carbon atoms, and phenyl- and alkylphenyl alkanols with 7 to 11 carbon atoms. Specific alcohols which fall within these groups include methanol, ethanol, propanol, 1-butanol, 2-methyl-1-propanol, 2-butanol, 2-methyl-2-propanol, 1-pentanol, 3-methyl-1-butanol, 2-pentanol, 3-butanol, hexanol, octanol, nonyl alcohol, dodecyl alcohol, cetyl alcohol, 1,2-ethanediol, 1,2-propanediol, 1,3-propanediol, 1,4-butanediol, 1,5-pentanediol, 1,6-hexanediol, 1,2,3-propanetriol, 1,2,3-butanetriol, cyclopentanol, cyclohexanol, cycloheptanol, and benzyl alcohol. Suitable inert hydrocarbons which can be used in the process include benzine fractions having boiling points ranging from 50 to 200° C., hexane, heptane, isooctane, toluol, xylol, tetraline, decaline, and cyclohexane among others.

As was pointed out above, the alcohol-hydrocarbon mixture should contain from 0.01 to 90 mol percent alcohol. The alcohol quantity in the reaction vessel should amount to from about 0.2 to 50 mol percent and preferably from 0.2 to 5.5 mol percent based on the quantity of titanium trichloride.

In the purification process, the titanium trichloride initially is washed at least once with an inert hydrocarbon and preferably is washed at least twice with an inert hydrocarbon. Thereafter, the titanium trichloride is contacted with the alcohol-hydrocarbon mixture and the mixture is heated (preferably under reflux) at a temperature not exceeding 100° C. Purification may also be carried out at temperatures as low as 10° C. in which case the reaction mixture must be vigorously agitated. In the latter case, the process takes much longer. The treatment time can vary over a wide range, depending upon the temperature, for example, from 0.5 minute to 3 hours.

If titanium trichloride is purified in accordance with this invention and is used in a known manner together with aluminum organic compounds such as aluminum trialkyls as a catalyst in the polymerization of olefins, an increase of yield of isotactic polymerizate of 10% and more can be obtained.

In the following examples the process is illustrated and is also compared with a prior art process.

*Example I*

Six (6) grams of titanium trichloride, which was produced by the reduction of titanium tetrachloride with hydrogen at 800 C., was washed with 50 cc. n-heptane for 15 minutes at 20° C. and then syphoned. The n-heptane had previously been purified by distillation over metallic sodium and was stored over sodium wire and under a nitrogen atmosphere. The washing with n-heptane was repeated. Thereafter, the titanium trichloride with n-heptane to which 2 mol percent methanol (based on the amount of titanium trichloride) had been added was heated thirty minutes to 70° C. After syphoning, the above described washing with n-heptane was repeated twice more.

The titanium trichloride which was purified as described above was placed in an enamelled autoclave along with 15 cc. of aluminum triethyl and 6 liters of n-heptane. The autoclave was equipped with a stirring device and had an 8 liter useable capacity. The reaction mixture was heated to 75° C. Thereafter, enough propylene was added to increase the pressure in the autoclave by 4 atmospheres and the polymerization was continued until the polymerizate concentration was about 20%. The remaining propylene pressure was then removed and the autoclave contents were transferred to a vessel containing about 4 liters of a 1% hydrochloric acid solution in ethanol. The catalyst was dissolved by brisk stirring. After cooling to 20° C. the polymerizate was syphoned off and washed with water until a neutral reaction was obtained. The dried polymerizate was extracted in a hot extractor with boiling n-heptane for 24 hours. The total soluble polymerizate portion in n-heptane amounted to 6.5%. The portion of isotactic polypropylene, therefore, was 93.5%.

*Example II*

In this example a quantity of 8 grams of titanium trichloride, which was produced and preliminarily purified as described in Example I, was heated to 70° C. for 30 minutes with n-heptane to which had been added 20 mol percent methanol, based on the amount of titanium trichloride. Thereafter, the titanium trichloride was washed twice with n-heptane and placed in an enamelled autoclave along with 20 cc. aluminum triethyl and 12 liters of n-heptane. The autoclave was heated to 75° C. Thereafter, 4 atmospheres of propylene was added to the autoclave. After the polymerization process had been completed, the polymerizate was purified as is described in Example I. The total soluble polymerizate portion in n-heptane amounted to 11% and, therefore, the isotactic polypropylene amounted to 89%.

*Example III*

This example illustrates the results that are obtained by following the prior art procedures. In this example a quantity of 4 grams of titanium trichloride, which was produced as described in Example I, was washed 6 times with 50 cc. n-heptane at 20° C. The titanium trichloride was placed in a 7 liter enamelled autoclave having a stirring device along with 10 cc. aluminum triethyl and 5 liters of n-heptane. The autoclave was heated to 75° C. and 4 atmospheres of propylene was added to the vessel. After completion of the polymerization reaction the polymerizate was purified and dried as described in Example I. The polymerizate contained a total of 22% of substances which was extractable with n-heptane and, therefore, 78% of isotactic polypropylene was obtained.

Obviously many modifications and variations of the invention as hereinbefore set forth may be made without departing from the spirit and scope thereof, and therefore only such limitations should be imposed as are indicated in the appended claims.

We claim:
1. In a process for purifying, activating and improving the catalytic properties of titanium trichloride which has been produced by the reduction of titanium tetrachloride with hydrogen and is contaminated with titanium tetrachloride and which has been washed with an inert hydrocarbon, the improvement which comprises: heating said titanium trichloride at a temperature not exceeding 100° C. in the presence of a homogeneous alcohol-inert hydrocarbon mixture containing at least 0.01 mol percent alcohol but in the absence of olefin, the amount of alcohol in the reaction mixture being from 0.2 to 50 mol percent based on the quantity of titanium trichloride, said alcohol being selected from the group consisting of methanol, ethanol, propanol, 1-butanol, 2-methyl-1-propanol, 2-butanol, 2-methyl-2-propanol, 1-pentanol, 3-methyl-1-butanol, 2-pentanol, 3-butanol, hexanol, octanol, nonyl alcohol, dodecyl alcohol, cetyl alcohol, 1,2-ethanediol, 1,2-propanediol, 1,3-propanediol, 1,4-butanediol, 1,5-pentanediol, 1,6-hexanediol, 1,2,3-propanetriol, 1,2,3-butanetriol, cyclopentanol, cyclohexanol, cycloheptanol, and benzyl alcohol, separating off said alcohol-inert hydrocarbon mixture and thereafter washing the titanium trichloride once again with an inert hydrocarbon whereby an activated and substantially moisture and titanium tetrachloride free catalyst is obtained.

2. In a process for purifying, activating and improving the catalytic properties of titanium trichloride which has been produced by the reduction of titanium tetrachloride with hydrogen and is contaminated with titanium tetrachloride and which has been washed with an inert hydrocarbon, the improvement which comprises: heating said titanium trichloride at a temperature not exceeding 100° C. in the presence of a homogeneous methanol-inert hydrocarbon mixture containing at least 0.1 mol percent methanol but in the absence of olefin, the amount of methanol in the reaction mixture being from 0.2 to 5.5 mol percent based on the quantity of titanium trichloride, separating off said methanol-inert hydrocarbon mixture and thereafter washing the titanium trichloride once again with an inert hydrocarbon whereby an activated and substantially moisture and titanium tetrachloride free catalyst is obtained.

References Cited in the file of this patent
UNITED STATES PATENTS

| | | |
|---|---|---|
| 2,880,199 | Jezl | Mar. 31, 1959 |
| 2,909,511 | Thomas | Oct. 20, 1959 |
| 2,925,392 | Seelbach et al. | Feb. 16, 1960 |
| 2,938,890 | D'Alelio | May 31, 1960 |
| 2,965,626 | Pilar et al. | Dec. 20, 1960 |
| 3,006,904 | Jahrstorfer et al. | Oct. 31, 1961 |
| 3,063,798 | Langer et al. | Nov. 13, 1962 |

OTHER REFERENCES

J. W. Mellor's "A Comprehensive Treatise on Inorganic and Theoretical Chemistry," vol. 7, 1927 Ed., page 81, Longmans, Green and Company, New York.